Oct. 16, 1956  W. DICKERSON  2,766,549
SINKER AND LEADER ASSEMBLY
Filed Nov. 9, 1953
Fig.1
Fig.2
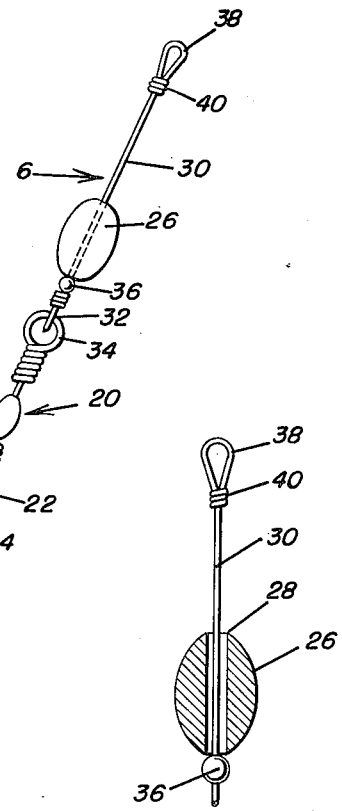
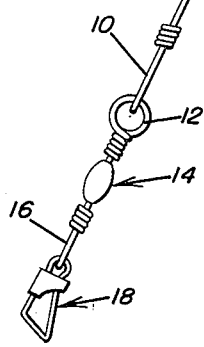
William Dickerson
INVENTOR.
BY *Clarence A. O'Brien*
and *Harvey B. Jacobson*
Attorneys

United States Patent Office 2,766,549
Patented Oct. 16, 1956

2,766,549

SINKER AND LEADER ASSEMBLY

William Dickerson, Pembroke, Ontario, Canada

Application November 9, 1953, Serial No. 390,965

1 Claim. (Cl. 43—44.98)

The present invention relates to fishing tackle and has reference in particular to an assemblage which is expressly adapted for attachment to the hook-equipped end of the fishing line and which is primarily helpful to the fisherman in that it provides for the expeditious use of sinkers and equally expeditious means allowing sinkers of varying weight to be selectively utilized.

The sinker problem is generally well known to anglers and makers and sellers handling fishing tackle and equipment. In these circumstances, many and varied adaptations and ideas have been resorted to by others looking toward a satisfactory solution of the stated problem. Since the need for sinkers each having a different weight or degree of heaviness is the usual requirement of the average fisherman, many prior art constructions utilize readily applicable and removable sinkers of one type or another. The instant invention likewise uses the detachable sinker principle. However, the means employed in reducing this phase of the concept to practice is novel and represents a significant achievement in the disclosure herein under advisement.

In carrying out the invention a combination assemblage is utilized, this being characterized by a leader, a sinker of a predetermined size and weight, and means for attaching said sinker to one end of said leader, said means serving to permit said sinker to be easily and speedily applied and removed, whereby another sinker of greater or lesser weight may be attached to said leader and used in lieu of the first named sinker.

More explicitly, the preferred embodiment of the invention has to do with a fishing line leader having a swivel and an accompanying snap-fastener at one end and a second swivel at its opposite end, an adapter wire having one end permanently joined to said second swivel, said wire having a fixed eye at its opposite end connectible with a fishing line, and a sinker removably mounted on said adapter wire and normally held in place by way of said wire, wherein said fixed eye is slender in a lengthwise direction, said sinker being a weight having an axial bore opening through opposite ends of the weight, said bore being of a prescribed diameter and said eye being compressibly resilient and larger in width than the diameter of said bore, whereby the sinker is retained on the wire until intentionally and forcibly pulled off by hand by holding the wire with one hand and yanking the sinker over the eye and off of the wire with the other hand.

Other objects, features and advantages will become more readily apparent from the following description and the accompanying sheet of illustrative drawings.

In the drawings, wherein like numerals are employed to designate like parts throughout the views:

Figure 1 is an elevational view disclosing the novel structural assemblage constituting the subject matter of the invention herein disclosed.

Figure 2 is a view on a slightly larger scale showing the sinker and the adapter wire on which it is mounted.

Referring now to the drawings, and especially to Figure 1, the assemblage, in a combination sense, is characterized by two primary complements; namely, leader means 4 and companion sinker means 6.

The means 4 comprises an appropriate leader 8 of flexible material having an eye 10 at the lower end connected with an eye 12 on the associated swivel 14 which latter is provided at its lower end with an eye 16 carrying a snap fastener 18 which in practice is connectible either with a fishing hook or a lure in an obvious manner (not shown). There is a similar swivel 20 at the upper end having an eye 22 connected with a connecting eye on the leader, the last named eye denoted at 24.

The sinker means comprises an egg-shaped or equivalent sinker 26 which may be of lead, brass or other appropriate metal, the same (see Figure 2) having an axial bore 28 opening through opposite upper and lower ends of the sinker. The bore is of uniform diameter of a prescribed or predetermined diameter. The sinker is removably mounted on an adapter wire 30 which may be preferably relatively short and comparatively rigid. This wire is provided at its lower end with an eye 32 connected or joined with an associate eye 34 on the swivel 20. The numeral 36 designates a fixed bead or similar element of a size to provide a stop shoulder for the sinker and to prevent the lower end from needlessly bearing against or wearing the swivel eye 34 or the adjacent connecting eye 32. There is a line attaching eye 38 at the upper end of the adapter wire which is formed by bending the wire on itself and twisting the end around the main shank of wire as at 40. This eye 38 is elongate and is resilient and therefore yields when pressure is exerted thereagainst. The point to be made here is that the widest portion of the slender eye 38 is wider than the cross-section or diameter of the bore 28 in the sinker so that it is possible to press the sinker off and on. In other words, the user may catch hold of the swivel 20 or any part of the adapter wire 30 and hold it in one hand and then catch hold of the sinker 26 and slide it off by forcing the sinker over the yieldable eye 38. This means therefore that the eye is sufficient to hold the sinker in place and also to provide a suitable connection for the end of the fishing line (not shown). What is more important, the construction permits sinkers of different sizes and weights to be readily applied and removed in an obvious manner.

Of significance and importance in the over-all assemblage is the combination characterized by the special eye-equipped adapter wire which affords a connection between the fishing line and the leader and which is preferably sold as a part of the leader and which makes it possible to apply and remove sinkers of varying weights with great ease and speed. The sinkers, any number of which will be sold as complements of the over-all package will, of course, be interchangeable in that, while they will vary in weight, the axial passage or bore through each will be standardized to correspond, for example, with the passage 28 shown in Figure 2 of the drawings.

With further reference to the fishing line and the mode of attaching the same to the aforementioned line eye 38, it is to be mentioned here that, for the most part, the fishing line will be provided with a swivel (not shown) and said swivel will, in turn, be attached to the line eye 38. Of course, there will be instances where the line may be attached directly to the stated eye.

As before stated, the elongate eye 38 is resilient, is expansible and contractible, and yields when it is placed under pressure by the withdrawal or removal step of the weight or sinker 26. Assuming, for example, that the sinker 26 is in its normal position on the wire 30 is resting against the stop shoulder 36 and it is desired to remove it for replacement with a smaller on or, larger one, as the case may be; all that is necessary is to catch hold of the eye-equipped end 32 of the wire 30 and holding it with one hand, to catch hold of the sinker with the other hand and yank the sinker along the wire 30 and to pull it over the eye 38 at which time the eye is squeezed and contracted to allow the sinker to be easily pulled off the wire 30. Conversely, during replacement the sinker may be forced with its bore against one end of the eye 38, squeezing the eye, and thus slipped easily in place on the wire 30, in an obvious manner.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

For use in connection with and adapted to be interposed between a leader and a complemental fishing line, in combination, a swivel, a flexible single-strand adapter wire having an eye at one end connected to said swivel, a shoulder adjacent said eye, a constantly closed elongated retainer eye at the other end of said adapter wire, said elongated retainer eye being resilient and expansible and contractible and adapted to accommodate an end of a fishing line, and a readily applicable and removable sinker slidably mounted on said adapter wire with one end normally bearing against said shoulder, said sinker having an axial bore therethrough and said bore being of a diameter of predetermined cross-section and said retainer eye being of a width at its greatest width dimension greater than the diameter of the bore, whereby the sinker is prevented from displacement at one end of the wire by said retainer eye until intentionally and forcibly pulled off by hand by catching hold of the wire with one hand and yanking the sinker over the retainer eye and off of the wire with the other hand.

References Cited in the file of this patent

UNITED STATES PATENTS

| | | |
|---|---|---|
| 1,023,676 | Pancoast | Apr. 16, 1912 |
| 2,030,000 | Harrington | Feb. 4, 1936 |
| 2,086,008 | Turner | July 6, 1937 |
| 2,189,979 | Fender | Feb. 13, 1940 |
| 2,214,668 | Erickson | Sept. 10, 1940 |
| 2,219,983 | Evenson | Oct. 29, 1940 |
| 2,225,676 | White | Dec. 24, 1940 |
| 2,651,135 | Greenleaf | Sept. 8, 1953 |

FOREIGN PATENTS

| | | |
|---|---|---|
| 647,389 | France | July 30, 1928 |
| 959,600 | France | Oct. 3, 1949 |